US 6,629,200 B1

(12) United States Patent
Kanamaru et al.

(10) Patent No.: US 6,629,200 B1
(45) Date of Patent: Sep. 30, 2003

(54) SYSTEM AND METHOD FOR CONTROLLING CACHE MEMORIES, COMPUTER SYSTEM, HARD DISK DRIVE UNIT, AND HARD DISK CONTROL UNIT

(75) Inventors: Atsushi Kanamaru, Kanagawa-ken (JP); Hideo Asano, Machida (JP); Akira Kibashi, Zama (JP); Takahiro Saito, Yokohama (JP); Keiji Kobayashi, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 09/687,270

(22) Filed: Oct. 13, 2000

(30) Foreign Application Priority Data

Oct. 15, 1999 (JP) ............................................. 11-293909

(51) Int. Cl.[7] ........................... G06F 12/08; G06F 13/00
(52) U.S. Cl. ......................... 711/113; 711/100; 711/122
(58) Field of Search ................................. 711/100, 113, 711/114, 117, 118, 122, 136, 137, 154

(56) References Cited

U.S. PATENT DOCUMENTS 5,369,751 A * 11/1994 Kambayashi et al. ......... 710/74
5,475,859 A * 12/1995 Kamabayashi et al. ........ 710/5
5,809,280 A * 9/1998 Chard et al. ................. 711/160
6,148,368 A * 11/2000 DeKoning ................... 711/113
6,243,795 B1 * 6/2001 Yang et al. .................. 711/159

FOREIGN PATENT DOCUMENTS

| JP | 02-114345 | 4/1990 | ........... G06F/12/08 |
| JP | 03-122737 | 5/1991 | ........... G06F/12/12 |
| JP | 05-088976 | 4/1993 | ........... G06F/12/08 |
| JP | 11110139 A | 4/1999 | ............ G06F/3/06 |

* cited by examiner

Primary Examiner—Tuan V. Thai
(74) Attorney, Agent, or Firm—Esther E. Klein; William D. Gill

(57) ABSTRACT

A system and method are provided that reduce the amount of data held commonly in both high-ranking and low-ranking cache memories, thereby having each of those cache memories hold data more efficiently. More particularly, a computer system is provided with an HDC card 21 connected to an expansion bus 20 and an HDD unit 22 connected to the HDC card 21. The HDC card 21 is provided with a disk cache (high-ranking cache memory) and the HDD unit 22 is provided with a disk cache 54 (low-ranking cache memory). The HDC card 21 and the HDD unit 22 exchange select information for selecting a swap mode of each cache memory when the system is started up, thereby selecting different swap modes according to the exchanged select information respectively.

17 Claims, 12 Drawing Sheets

[Figure 1]
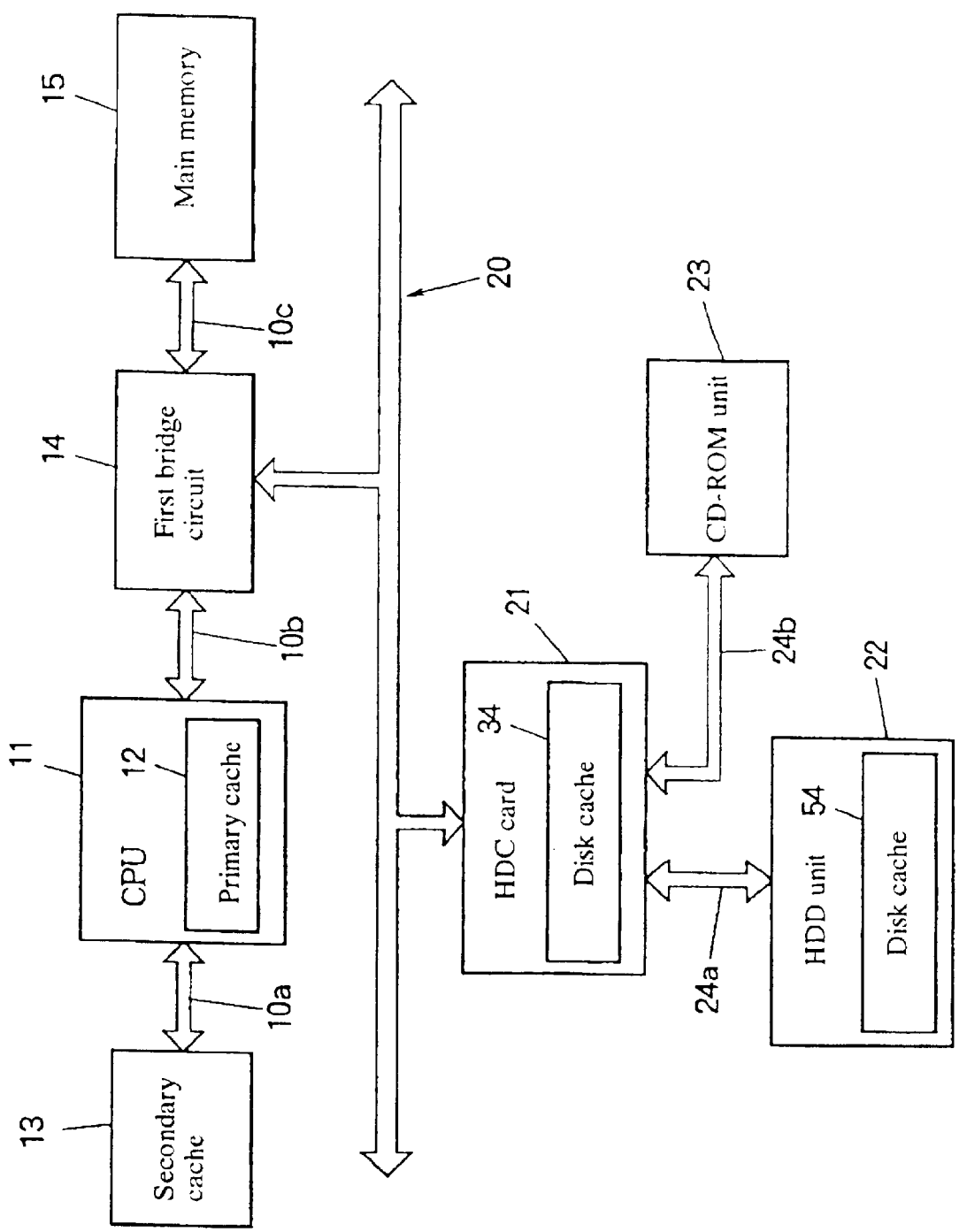

[Figure 2]
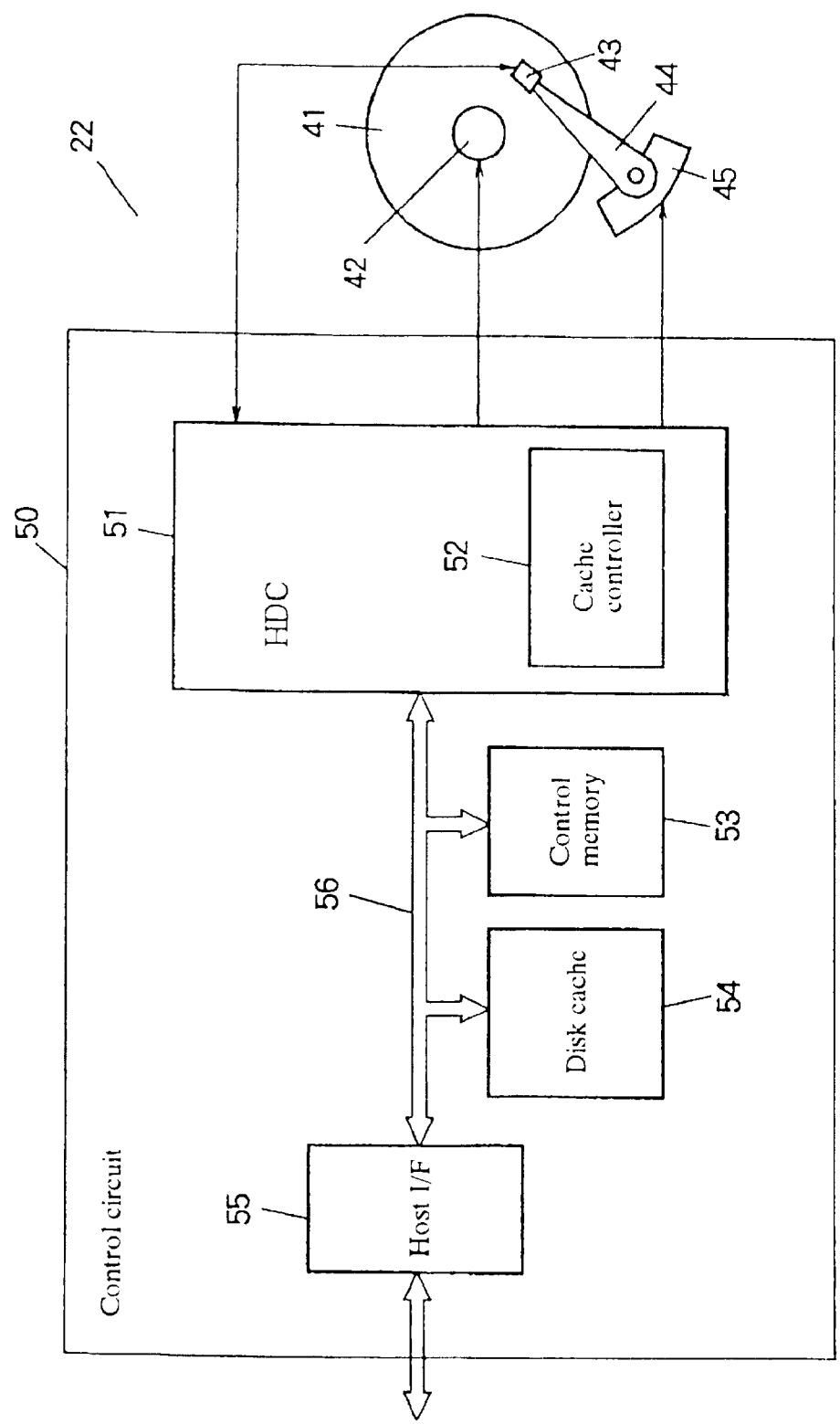

[Figure 3]
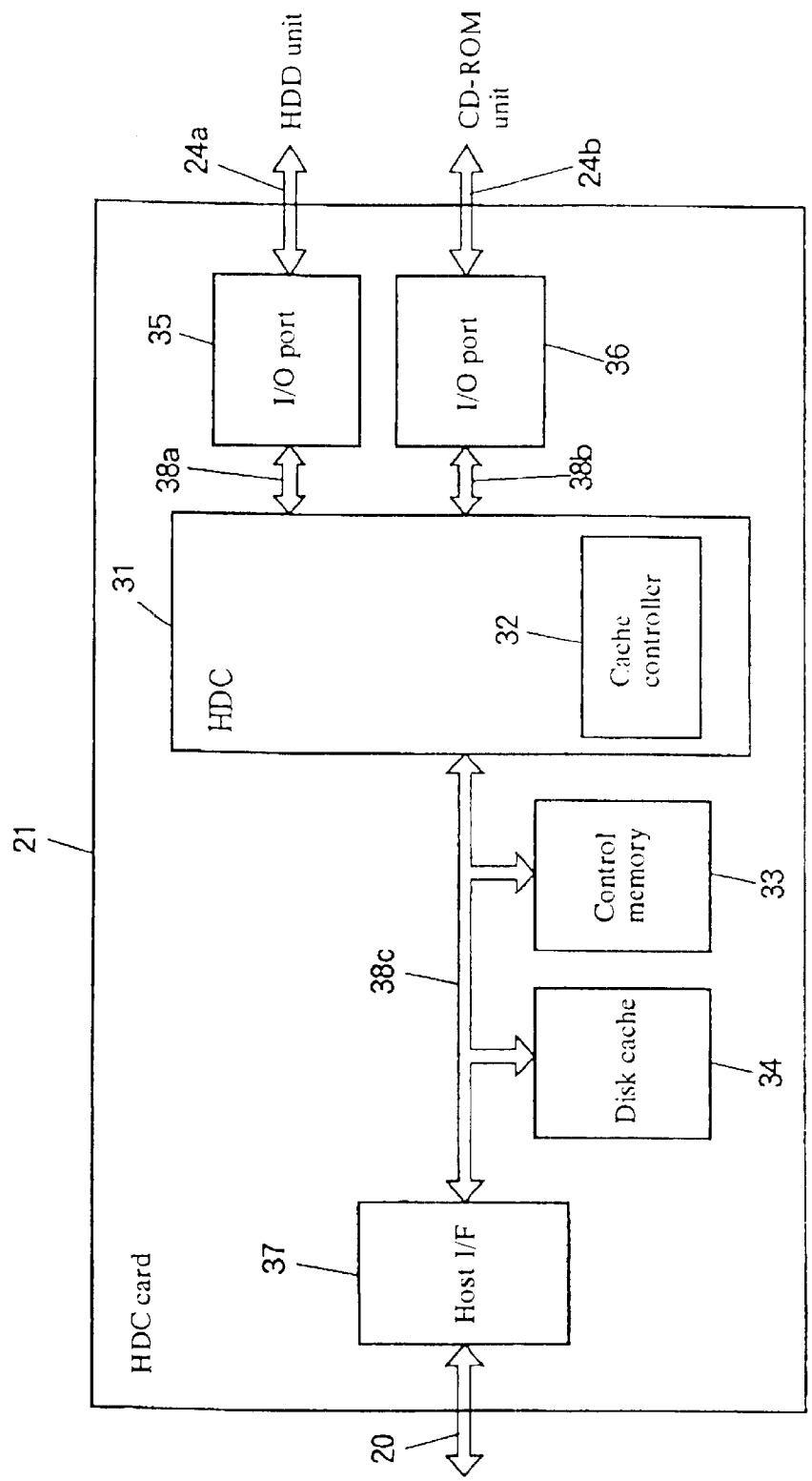

[Figure 4]
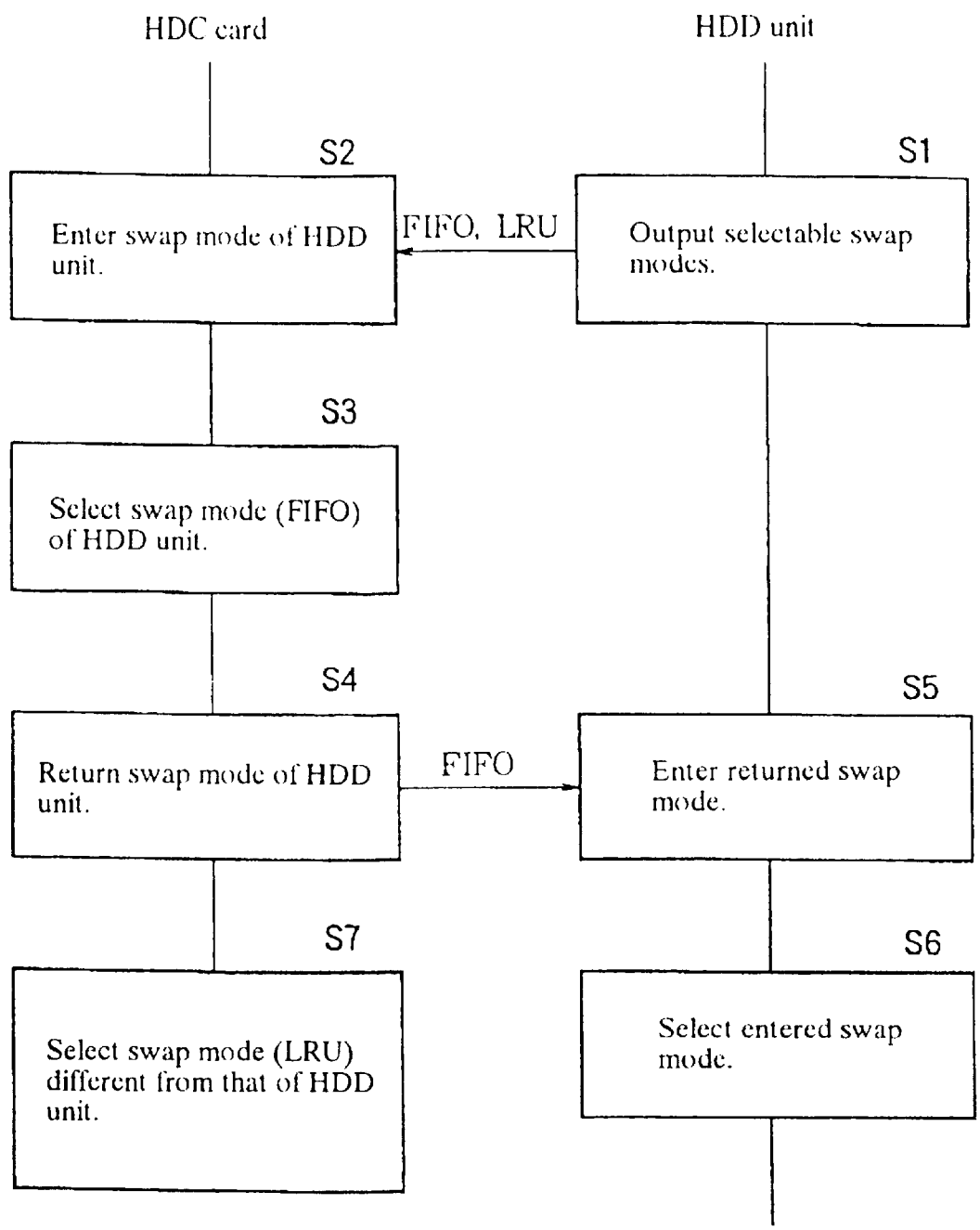

[Figure 5]
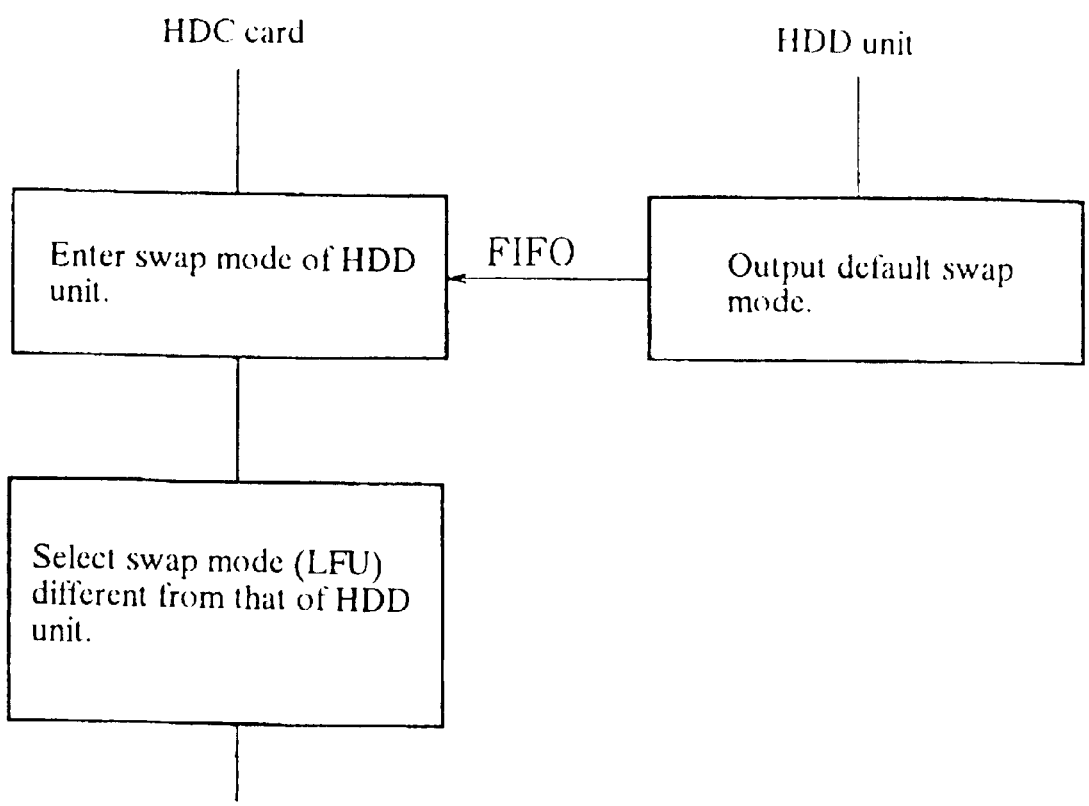

[Figure 6]
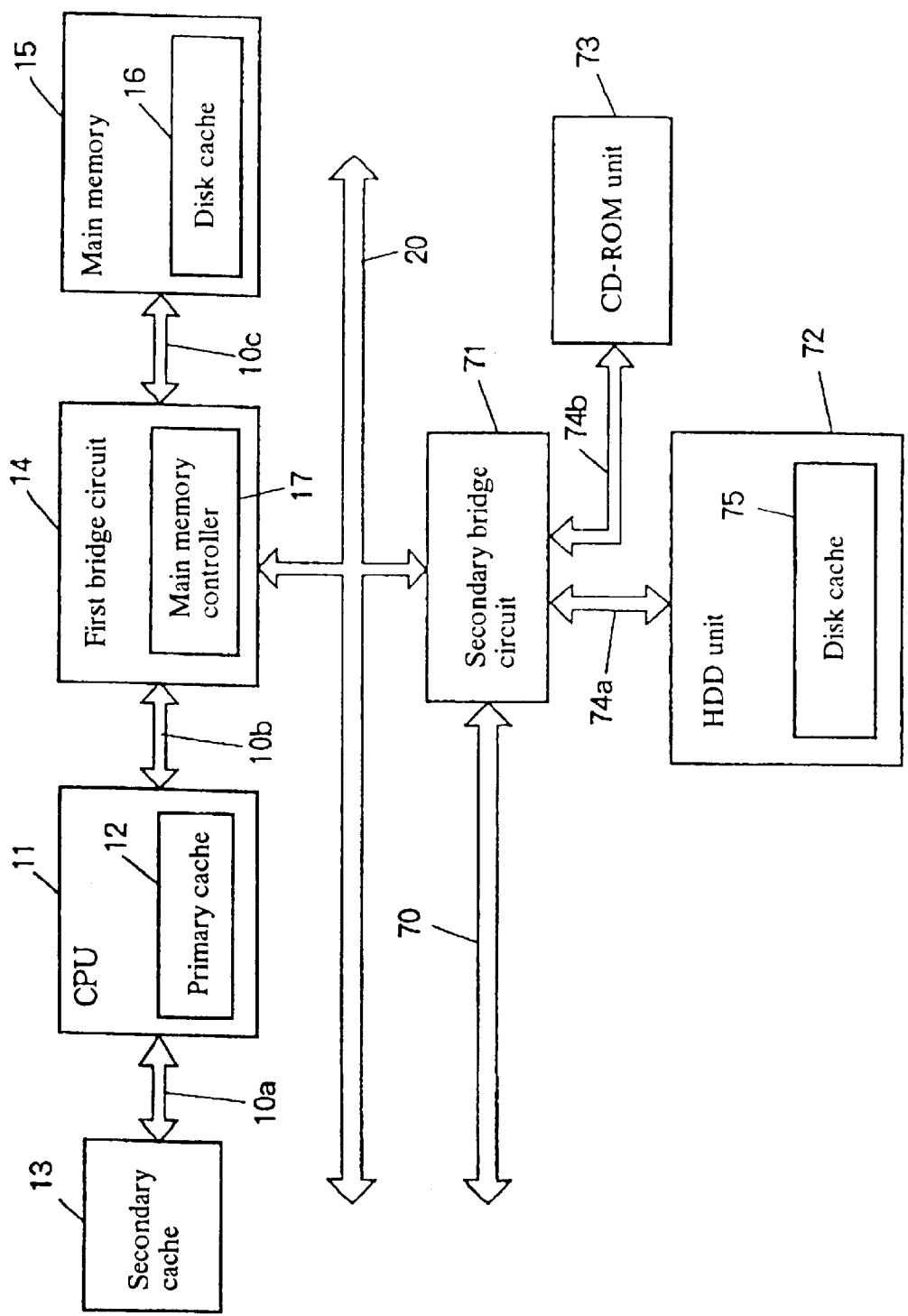

[Figure 7]
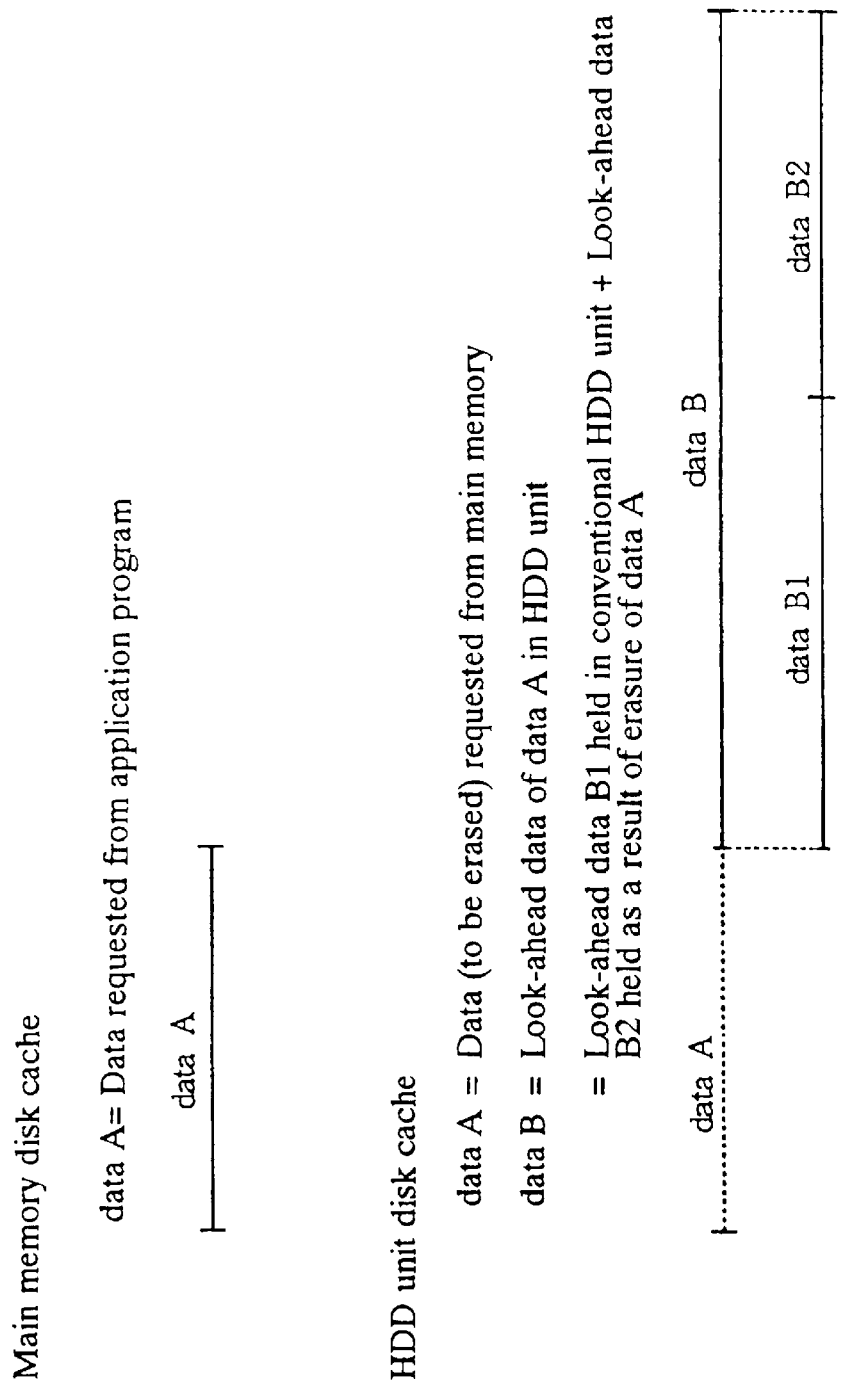

[Figure 8]
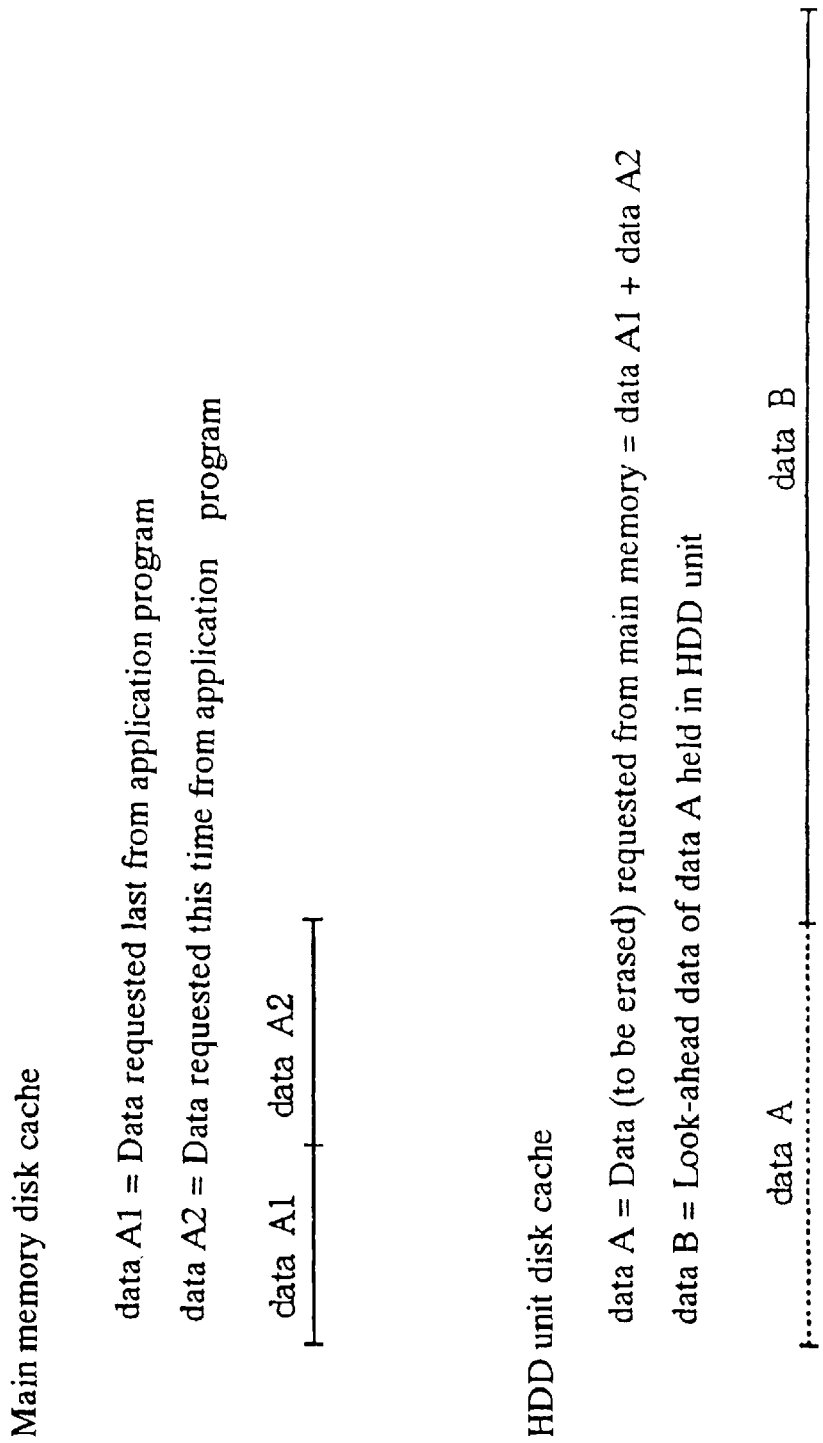

[Figure 9]
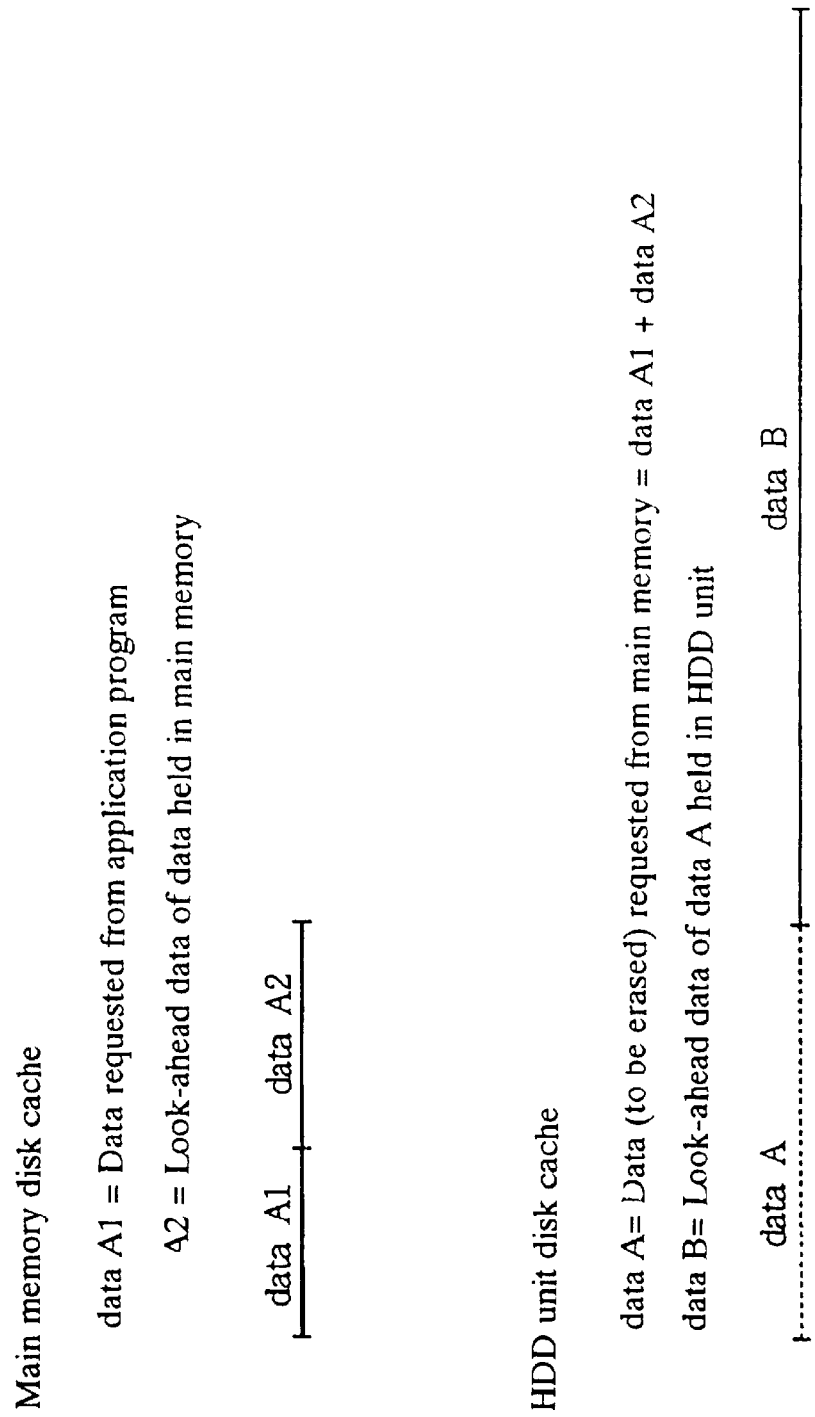

[Figure 10]

Main memory disk cache data A1 = Data requested by command 1 from application program
data A2 = Look-ahead data of data A1
data A3 = Data requested by command 2 from application program
data A4 = Look-ahead data of data A3 program
data A5 = Data requested by command 3 from application
data A6 = Look-ahead data of data A5

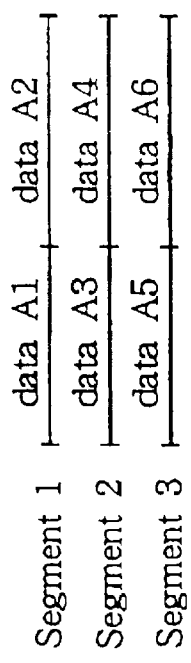

HDD unit disk cache data A = Data requested most recently from main memory = data A5 + data A6
data B = Look-ahead data of data A held in HDD unit

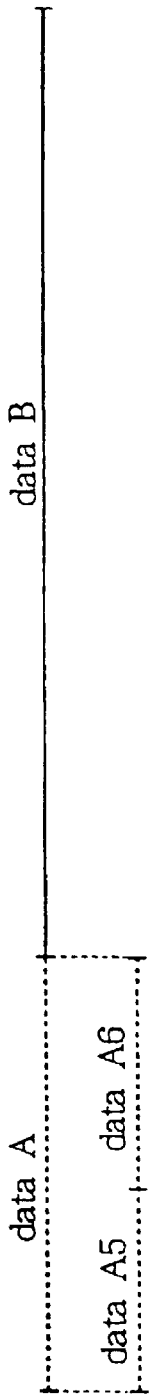

[Figure 11]

Main memory disk cache data A1 = Data requested to HDD unit corresponding to command 1 from application program data A2 = Data requested to HDD unit corresponding to command 2 from application program data A3 = Data requested to HDD unit corresponding to command 3 from application program

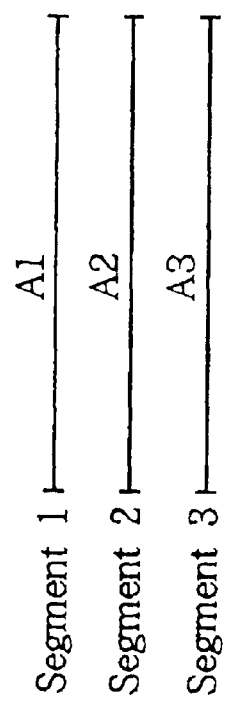

HDD unit disk cache data C1 = Look-ahead data of data A1 from main memory data C2 = Look-ahead data of data A2 from main memory data C3 = Look-ahead data of data A3 from main memory

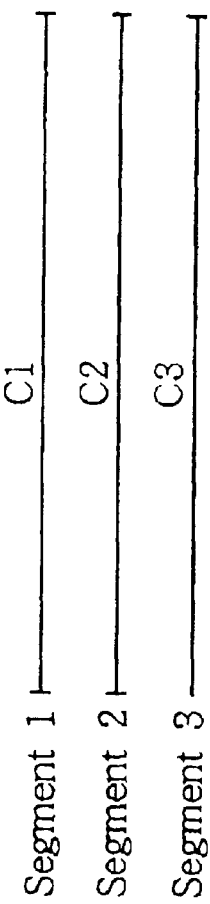

[Figure 12]
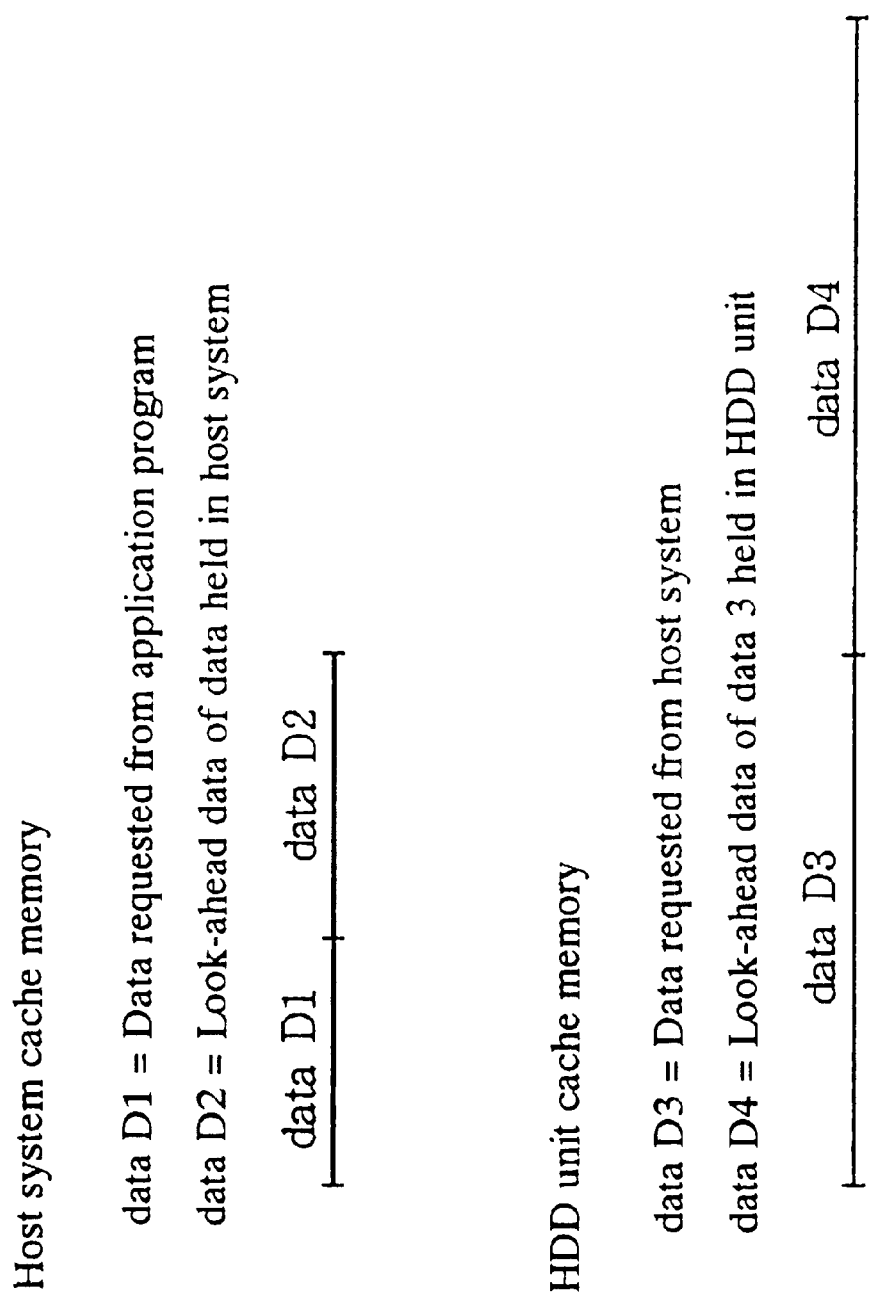

SYSTEM AND METHOD FOR CONTROLLING CACHE MEMORIES, COMPUTER SYSTEM, HARD DISK DRIVE UNIT, AND HARD DISK CONTROL UNIT

BACKGROUND OF THE INVENTION

1. Field of the invention

The present invention relates to a method for controlling a plurality of cache memories, as well as to a computer system, a hard disk drive unit, and a hard disk control unit used to enable those cache memories to hold data efficiently.

2. Description of Related Art

A computer system is usually composed of devices such as a CPU, a main memory, and an HDD (Hard Disk Drive) unit which have different data transfer rates. Generally, a DRAM is employed as such a main memory. The data transfer rate of the DRAM is far slower than that of the CPU, so the DRAM often becomes a factor for lowering the operation speed of the CPU. The data transfer rates of such external storage devices as an HDD unit, a CD-ROM unit, etc. are far slower than that of the DRAM, so the operation speed of the DRAM is often lowered by the operation of such a device. Such an operation speed difference among devices that exchange data with each other, therefore, hinders the intended performances of those devices even when they have an ability for transferring data fast respectively, since the transfer rate of the whole system is dominated by a device having the slowest transfer rate among them.

In order to reduce such a speed difference among devices, therefore, a computer system is provided with a cache memory. The cache memory makes the most use of the localization of the object program and/or data, thereby storing part of the data stored in the low-ranking device having a slow data transfer rate. Consequently, the number of accesses to the low-ranking device is reduced, thereby improving the data transfer rate of the whole computer system.

A typical cache memory is provided between a CPU and a main memory. If there are a plurality of cache memories, they are called the primary cache, the secondary cache, . . . sequentially from the CPU side. The closer the cache is to the CPU, the smaller the storage capacity becomes. Generally, an SRAM is employed for each of those cache memories.

The main memory is used as a cache memory for an external storage. Consequently, the number of accesses to the external storage is reduced, thereby the operation speed of the main memory can be improved. Sometimes, a cache memory is also provided in such an external storage as a so-called extended card, etc. For example, each HDD unit is provided with a cache memory for holding part of data stored in a magnetic disk. With the use of such a cache memory, the number of accesses to the magnetic disk is reduced, thereby the data transfer rate of the HDD unit can be improved. A cache memory provided in the main memory, the extended card, the HDD unit, etc. in this way is referred to as a disk cache.

Generally, a data reading method referred to as a "Look-Ahead Method" is employed for those disk caches. According to this "look-ahead" data reading method, after ending a read of requested data from an area requested by a host system, the data in the area following that of the requested data is also read together. This method can thus improve the cache hitting rate in reading data sequentially from consecutive addresses in ascending order of their numbers.

FIG. 12 shows how data is read from a conventional disk cache.

In FIG. 12, a host system means a unit that requests reading/writing data from/to an HDD unit. Each of the host system and the HDD unit is provided with a cache memory and data is exchanged between the cache memories of those units. In this case, the cache memory of the host system is regarded as a high-ranking cache memory and the cache memory of the HDD unit is regarded as a low-ranking cache memory. It is premised here that data D1 requested from an application program is held in none of the host system and the HDD unit.

If an application program requests the host system to transfer data D1, a cache mis-hit occurs in the host system. The HDD unit is thus requested to transfer data D3 including both data D1 and data D2 in the address following the address of this data D1. In the HDD unit, therefore, the data D3 requested from the host system is read from the object magnetic disk and held in the cache memory to cope with this cache mis-hit. The data D3 is transferred to the host system. Consequently, the cache memory of the host system holds the data D3. And furthermore, in the HDD unit, the data D4 in the address following that of the transferred data D3 is read from the magnetic disk and held in the cache memory.

Such a look-ahead data reading method is disclosed in, for example, the official gazette of Published Unexamined patent application Ser. No. 11-110139. The gazette describes both method and apparatus for reading data in the look-ahead manner. According to the method and the apparatus described in this gazette, if a read operation is detected in the direction of consecutive addresses in descending order of their numbers, the requested data is read from an area requested from the host system, then data is also read from an address preceding the address of the requested data, thereby the cache hitting rate can be improved during reading in the reverse direction of consecutive addresses in descending order of their numbers.

However, according to the conventional method for holding data in a cache memory, the same data is held in both host system and HDD unit. If reading of data is requested from an application program to the host system and the host system hits the cache memory, therefore, the requested data is transferred from the host system to the high-ranking cache memory. The HDD unit is never requested to read the data. Consequently, if the same data is held in the cache memory of the HDD unit at this time, the data will not be used effectively.

Under such circumstances, it is an object of the present invention to provide a method for controlling a plurality of cache memories, which can solve the above conventional problems and avoid a wasteful operation that common data is held in both high-ranking and low-ranking cache memories or reduce such common data to be held in both high-ranking and low-ranking cache memories, thereby holding data more efficiently in each of those cache memories, as well as to provide a computer system, a hard disk drive unit, and a hard disk control unit that are all employing the method for controlling a plurality of cache memories.

SUMMARY OF THE INVENTION

The present invention provides a method for controlling a plurality of cache memories including a low-ranking cache memory and a high-ranking cache memory so that the high-ranking and low-ranking cache memories are operated in different swap modes.

The computer system of the present invention is provided with a low-ranking cache memory and a high-ranking cache memory connected to the low-ranking cache memory. The high-ranking and low-ranking cache memories exchange select information for selecting a swap mode respectively with each other when said computer system is started up, thereby selecting different swap modes according to the exchanged select information respectively.

The hard disk drive unit of the present invention is provided with a low-ranking cache memory for storing part of the data stored in a magnetic disk and it is connected to a host system having functions of a high-ranking cache memory.

Each of the high-ranking and low-ranking cache memories exchanges select information with the host system so that the high-ranking and low-ranking cache memories are operated in different swap modes when the system is started up. According to the exchanged select information, the hard disk drive unit selects the swap mode of the low-ranking cache memory.

According to a preferred embodiment of the present invention, a hard disk control unit is provided with a first connection terminal connected to an extended connection terminal of a peripheral device provided for the computer system, a second connection terminal connected to a hard disk drive unit having a low-ranking cache memory for storing part of the data stored in a magnetic disk, and a high-ranking cache memory for holding part of the data stored in the hard disk drive unit connected to the second connection terminal. This hard disk control unit controls the hard disk drive unit connected to the second connection terminal and enables the high-ranking and low-ranking cache memories to exchange select information with the hard disk drive unit connected to the second connection terminal when the computer system connected to the first connection terminal is started up so that the high-ranking and low-ranking cache memories are operated in different swap modes. The hard disk control unit selects the swap mode of the high-ranking cache memory according to the exchanged select information.

Another preferred embodiment of a hard disk control unit, according to the present invention, is provided with a first connection terminal connected to an extended connection terminal of a peripheral device of a computer system provided with a host system having functions of a high-ranking cache memory, a second connection terminal connected to a hard disk drive unit, and a low-ranking cache memory for holding part of the data stored in the hard disk drive unit connected to the second connection terminal. This hard disk control unit controls the hard disk drive unit connected to the second connection terminal and enables both high-ranking and low-ranking cache memories to exchange select information with the host system so that they can be operated in different swap modes when the computer system connected to the first connection terminal is started up. The hard disk control unit then selects the swap mode of the low-ranking cache memory according to the exchanged select information.

Another preferred embodiment of the present invention provides a method for controlling cache memories comprising the step of erasing data from a low-ranking cache memory after the data is transferred to a host system in response to a request for data transfer issued from the host system to the low-ranking cache memory.

In a further preferred embodiment of the present invention a method for controlling cache memories is provided comprising the step of holding part of data held in a low-ranking cache memory in a high-ranking cache memory; wherein data transferred from the low-ranking cache memory to the high-ranking cache memory in response to a request of data transfer issued from the high-ranking cache memory to the low-ranking cache memory is erased from the low-ranking cache memory.

In another preferred embodiment, a computer system includes: a low-ranking cache memory; and a high-ranking cache memory for holding part of data stored in the low-ranking cache memory; wherein the low-ranking cache memory, when a request of data transfer is issued from the high-ranking cache memory to the low-ranking cache memory, erases the data transferred from the low-ranking cache memory to the high-ranking cache memory in response to the request.

In another preferred embodiment, a hard disk drive unit is provided with a cache memory for storing part of the data stored in a magnetic disk. The cache memory is characterized in that the cache memory erases the data transferred to the host system in response to a request of data transfer issued from the host system connected to this hard disk drive unit.

In another preferred embodiment, a hard disk control unit is provided with a first connection terminal connected to an extended connection terminal of a peripheral device provided for a computer system, a second connection terminal connected to a hard disk drive unit, and a cache memory for holding part of the data stored in the hard disk drive unit connected to the second connection terminal. This control unit controls the hard disk drive unit connected to the second connection terminal and the cache memory, when receiving a request of data transfer from the host system through the first connection terminal, erases the data transferred to the host system in response to the request.

BRIEF DESCRIPTION OF THE DRAWINGS

FIG. 1 is a schematic block diagram of a computer system in a first embodiment of the present invention;

FIG. 2 is a schematic block diagram of the HDD unit shown in FIG. 1;

FIG. 3 is a schematic block diagram of the HDC card 21 shown in FIG. 1;

FIG. 4 is a diagram showing an example of an operation sequence of a cache memory for selecting a swap mode;

FIG. 5 is a diagram showing another example of an operation sequence of a cache memory for selecting a swap mode;

FIG. 6 is a schematic block diagram of a computer system in a second embodiment of the present invention;

FIG. 7 is a diagram showing an example of the operation of a cache memory for holding data;

FIG. 8 is a diagram showing another example of the operation of the cache memory for holding data;

FIG. 9 is a diagram showing further another example of the operation of the cache memory for holding data;

FIG. 10 is a diagram showing further another example of the operation of the cache memory for holding data;

FIG. 11 is a diagram showing further another example of the operation of the cache memory for holding data; and FIG. 12 is a diagram showing how data is read from a 71.

DETAILED DESCRIPTION OF THE PREFERRED EMBODIMENT

Hereunder, the embodiments of the present invention will be described with reference to the accompanying drawings with respect to a method for controlling cache memories, as well as a computer system.

A First Preferred Embodiment

A method for controlling cache memories in a first embodiment of the present invention enables both high-ranking and low-ranking cache memories to be operated in different swap modes. The "swap" means replacing old data held in a cache memory with new data when the cache memory has no empty space.

Main swap modes to be employed for the method of the present invention are the LRU (Least Recently Used) mode, the LFU (Least Frequently Used) mode, and the FIFO (First-In First-Out) mode. The LRU mode is a mode for swapping out data that is not accessed for the longest time. The LFU mode is a mode for swapping out data that is accessed least frequently. The FIFO mode is a mode for swapping out data that is held first sequentially. The swap modes are not limited only to those; for example, various other swap modes including a method for swapping out a segment having the least amount of data may also be employed.

If both high-ranking and low-ranking cache memories are operated in the same swap mode, both cache memories come to hold data of the same characteristic. For example, if both high-ranking and low-ranking cache memories are operated in the LRU mode, the data that is not accessed for the longest time is swapped out. Consequently, the data that is accessed most recently is held in those cache memories. And, if both high-ranking and low-ranking cache memories are operated in the LFU mode, the data that is accessed least frequently is swapped out. Consequently, the data that is accessed frequently is held in those cache memories. Furthermore, if both high-ranking and low-ranking cache memories are operated in the FIFO mode, then the data that is held first is swapped out sequentially from those cache memories. Consequently, the data that is accessed most recently is held in those cache memories.

On the contrary, if, for example, the high-ranking cache memory is operated in the LFU mode and the low-ranking cache memory is operated in the FIFO mode, then the data that is accessed frequently is held in the high-ranking cache memory and the data that is accessed most recently is held in the low-ranking cache memory. In this way, data items of different characteristics are held in those cache memories, and thus it is possible to reduce the possibility that the same data is held in both cache memories. In other words, it is possible to reduce the possibility that the data held in the high-ranking cache memory is also held in the low-ranking cache memory, so data can be held in each cache memory efficiently.

Preferably, those high-ranking and low-ranking cache memories should be operated in different swap modes of different characteristics. This is because the possibility that different data items are held in those high-ranking and low-ranking cache memories becomes higher than when those cache memories are operated in swap modes of similar characteristics, thereby each cache memory can be used more efficiently. However, it should be avoided to use any swap mode that might lower the cache hitting rate. This is because such a cache memory cannot give full play to its function for making the most use of data localization.

Next, a description will be made of a computer system for realizing this cache memory controlling method.

FIG. 1 shows a schematic block diagram of a computer system in the first embodiment of the present invention.

As shown in FIG. 1, this computer system comprises a CPU 11, a secondary cache 13, a first bridge circuit 14, and a main memory 15. The CPU 11 is provided with a primary cache 12. The CPU 11 is connected to the secondary cache 13 through an external bus 10a. The CPU 11 is connected to the first bridge circuit 14 through an external bus 10b. The first bridge circuit 14 is connected to the main memory 15 through an external bus 10c. Each of the primary cache 12 and the secondary cache 13 is composed of, for example, an SRAM. The primary cache 12 is provided with a storage capacity of several tens of kilobytes to several hundreds of kilobytes. The secondary cache 13 is provided with a storage capacity of, for example, several hundreds of kilobytes to several megabytes. The main memory 15 is composed of, for example, a DRAM. The main memory 15 has a storage capacity of, for example, several tens of megabytes to several hundreds of megabytes.

The first bridge circuit 14 is connected to an expansion bus 20 used for an expanded peripheral device. The expansion bus 20 is composed of, for example, a PCI (Peripheral Component Interconnect) bus. The first bridge circuit 14 has functions of, for example, a clock generator, a CPU interface, a secondary cache controller, a main memory controller, a PCI bus interface, etc. that are not illustrated.

An HDC (Hard Disk Controller) card 21 is connected to the expansion bus 20. In addition, an HDD (Hard Disk Drive) unit 22 and a CD-ROM unit 23 are connected to the HDC card 21 through a bus 24a and a bus 24b respectively. Each of the buses 24a and 24b is, for example, an ATA (AT Attachment)/ATAPI (ATA Packet Interface) bus. The HDC card 21 is used to add another HDD unit and/or expand the controlling functions of the HDD unit.

The HDC card 21 is not limited only to that used for expanding the controlling functions of the HDD unit 22; it may be any card if it is provided with a cache memory. For example, it may be an SCSI (Small Computer System Interface) card. The expansion bus 20 is not limited only to the PCI bus and the buses 24a and 24b are not limited only to the ATA/ATAPI bus.

FIG. 2 shows a schematic block diagram of the HDD unit shown in FIG. 1.

As shown in FIG. 2, the HDD unit 22 is provided with a magnetic disk 41 having a data recording surface and a head slider 43 (not shown) having a magnetic head for both recording and regenerating.

The magnetic disk 41 is attached fixedly to the rotary shaft of a spindle motor 42 and rotated by the spindle motor 42. The head slider 43 is fixed to a tip portion of the head arm 44. The head arm 44 is attached to an actuator 45 and supports the head slider 43 elastically. The head arm 44 is rotated by the actuator 45 above the recording surface of the magnetic disk 41. Consequently, the head slider 43 moves approximately in the radial direction of the magnetic disk 41, thereby data is accessed at a given position on the recording surface of the magnetic disk 41.

Herein, one or more magnetic disks may be used as the magnetic disk 41. A recording surface is formed at one side or both sides of the magnetic disk 41. The head slider 43 and the head arm 44 are provided so as to be corresponded to each recording surface of the magnetic disk 41.

A driving mechanism, which is composed of the magnetic disk 41, the spindle motor 42, the head slider 43, the head arm 44, and the actuator 45, is controlled by a control circuit 50. The control circuit 50 is provided with an HDC (Hard Disk Controller) 51, a control memory 53, a disk cache 54, and a host I/F 55. Those components are connected to each another through a bus 56.

The HDC 51 controls the whole HDD unit 22 according to a control program and/or control data stored in the control memory 53. The HDC 51 executes an arithmetic operation for controlling the error to occur in servo controlling and/or in recording/regenerating, thereby driving the spindle motor 42 and the actuator 45 so as to record data on the magnetic disk 41 through the magnetic head for recording, as well as regenerate and read data from the magnetic disk 41 through the magnetic head for regeneration. The HDC 51 is provided with a cache controller 52 for enabling the disk cache 54 to hold part of the data recorded on the magnetic disk 41.

The control memory 53 stores a control program executed by the HDC 51 and control data used for the control program. The disk cache 54 stores write data to be recorded on the magnetic disk 41 temporarily. The disk cache 54 also has functions of a buffer memory for storing data read from the magnetic disk 41 temporarily. The HDC card 21 is connected to the host I/F 55 through a bus 21a. The host I/F 55 is an interface circuit for exchanging data with the HDC card 21.

The disk cache 54 has a cache memory function for holding part of the data recorded on the magnetic disk 41 as described above. The disk cache 54 is equivalent to a low-ranking cache memory. The disk cache 54 is composed of, for example, a DRAM and has a storage capacity of several megabytes to several tens of megabytes. The cache controller 52 controls this disk cache. The cache controller 52 supports swap modes, for example, the FIFO mode and the LRU mode.

The HDD unit 22 exchanges setup information with the HDC card (host system) 21 when this computer system is started up, and the HDD unit 22 is initialized according to the exchanged setup information. At this time, the HDD unit 22 transfers the swap mode (FIFO or LRU mode) of the cache memory that it can select to the HDC card 21 and selects the swap mode transferred from the HDC card 21 in response to the transfer as the swap mode of its cache memory.

FIG. 3 shows a schematic block diagram of the HDC card 21 shown in FIG. 1.

As shown in FIG. 3, the HDC card 21 is provided with an HDC 31, a control memory 33, a disk cache 34, an I/O port 35, an I/O port 36, and a host I/F 37. The HDC 31, the control memory 33, the disk cache 34, and the host I/F 37 are connected to each other through a bus 38c. The I/O port 35 is connected to the HDC 31 through a bus 38a and the I/O port 36 is connected to the HDC 31 through a bus 38b respectively.

The HDC 31 controls the whole HDC card 21 according to the control program and control data stored in the control memory 33. The HDC 31 is provided with a cache controller 32 for enabling the disk cache 34 to hold part of the data stored in the HDD unit 22.

The control memory 33 stores a control program executed by the HDC 31 and control data used for the control program. The disk cache 34 stores write data to be stored in the HDD unit 22 temporarily. The disk cache 34 is also provided with functions of a buffer memory for storing data read from the HDD unit 22 temporarily. The I/O port 35 is connected to the HDD unit 22 through a bus 24a and the I/O port 36 is connected to the CD-ROM unit 23 through a bus 24b. The host I/F 37 is connected to an expansion bus 20. The host I/F 37 is an interface circuit for sending/receiving data through the expansion bus 20.

The disk cache 34 is provided with functions of a cache memory for holding part of the data stored in the HDD unit 22 as described above. The disk cache 34 is thus equivalent to a high-ranking cache memory with respect to the disk cache 54 provided in the HDD unit 22. The disk cache 34 is composed of, for example, a DRAM and has a storage capacity of several megabytes to several tens of megabytes. The cache controller 32 controls the disk cache 34. The cache controller 32 supports, for example, FIFO, LRU, and LFU modes.

The HDC card 21 sends/receives setup information to/from the HDD unit (low-ranking unit) 22 when this computer system is started up, and the HDC card 21 is initialized according to the sent/received setup information. At this time, for example, the HDC card 21 selects a swap mode that the HDD unit 22 should select, from among the swap modes transferred from the HDD unit 22, then transfers the selected swap mode to the HDD unit 22. And furthermore, it selects a swap mode different from that transferred to the HDD unit 22 as the swap mode of its cache memory. The priority for selecting the object swap mode is set beforehand.

FIG. 4 shows an example of an operation sequence of a cache memory for selecting a swap mode.

The computer system is started up, then the HDD unit 22 transfers selectable swap modes (FIFO and LRU modes) of the cache memory to the HDC card 21 (step S1). Receiving the swap modes from the HDD unit 22 (step S2), the HDC card 21 selects a swap mode that should be selected by the HDD unit 22 from the received swap modes according to the preset priority (step S3) and sends the selected swap mode to the HDD unit 22 (step S4).

Receiving the swap mode from the HDC card 21 (step S5), the HDD unit 22 selects it as the swap mode of its cache memory (step S6). On the other hand, the HDC card 21 selects a swap mode (LRU mode) different from the swap mode of the HDD unit 22 as the swap mode of its cache memory according to the preset priority (step S7).

The sequence shown in FIG. 5 can also be used to select a swap mode of an object cache memory. It is premised in this case that a default swap mode (FIFO mode) is preset in the HDD unit 22.

The default swap mode (FIFO mode) preset in the HDD unit 22 is transferred to the HDC card 21 from the HDD unit 22 (step S11) when the computer system is started up. Receiving the swap mode from the HDD unit 22 (step S12), the HDC card 21 selects a swap mode (LFU mode) different from that of the HDD unit 22 as the swap mode of its cache memory (step S13) according to the preset priority.

Furthermore, if the HDC card 21 does not have any swap mode different from the default swap mode of the HDD unit 22, then it is possible for the HDC card 21 to notify the HDD unit 22 of the effect so that the HDD unit 22 selects a swap mode different from the default swap mode.

In FIG. 4, the HDC card 21 can decide the object swap mode, but it is also possible to enable the HDD unit 22 to decide the object swap mode. In such a case, it is only required that the unit that cannot decide the swap mode has at least one swap mode. Also in FIG. 5, the HDC card 21 may be replaced with the HDD unit 22 in position so that the HDC card 21 transfers the default swap mode to the HDD unit 22.

In this way, swap modes can be exchanged between the cache memory (high-ranking cache memory) of the HDC card 21 and the cache memory (low-ranking cache memory) of the HDD unit 22 when the computer system is started up, so that those cache memories can select different swap modes. Consequently, each of those cache memories can select its optimized swap mode.

The swap mode selecting operation is not limited only to that described above; various other methods can also be employed. For example, it is also possible that one cache memory transfers its unselectable swap modes to the other cache memory and the other cache memory selects its swap mode from those transferred swap modes.

A Second Preferred Embodiment

A method for controlling cache memories in a second embodiment of the present invention prevents the high-ranking and low-ranking cache memories from holding common data. Concretely, the data transferred from the low-ranking cache memory to the high-ranking cache memory is erased from the low-ranking cache memory. With this method, the low-ranking cache memory can hold data more efficiently.

FIG. 6 shows a schematic block diagram of a computer system according to the second embodiment of the present invention.

In FIG. 6, the same symbols are given to the same components as those shown in the first embodiment shown in FIG. 1, avoiding redundant description.

As shown in FIG. 6, the second bridge circuit 71 is connected to the expansion bus 20. And, a peripheral device (not illustrated), an HDD unit 72, and a CD-ROM unit 73 can be connected to the second bridge circuit 71 through a bus 70, a bus 74a, and a bus 74b respectively. The bus 70 is, for example, an ISA (Industry Standard Architecture) bus. The buses 74a and 74b are, for example, an ATA (AT Attachment)/ATAPI (ATA Packet Interface) bus.

The second bridge circuit 71 is used to connect a peripheral device to an expansion bus whose specification is different from that of the expansion bus 20. The second bridge circuit 71 is provided with functions of a PCI bus interface, an interruption controller, a DMA (Direct Memory Access) controller, an ISA bus interface, etc. The bus 70 is not limited only to the ISA bus and the buses 74a and 74b are not limited only to the ATA/ATAPI bus.

The main memory 15 exchanges data with the HDD unit 72 according to the instructions issued from the CPU 11. This main memory 15 is provided with a disk cache 16 for holding part of the data stored in the HDD unit 72. The disk cache 16 is equivalent to a high-ranking cache memory with respect to the disk cache 75 provided in the HDD unit 72. The disk cache 16 has a storage capacity of, for example, several megabytes to several tens of megabytes. The main memory controller 17 provided in the first bridge circuit 14 controls the disk cache 16.

The disk cache 16 of the main memory 15 (precisely, the main memory controller 17), when it holds no data requested from the CPU 11, requests the HDD unit 72 for transfer of the data including both data requested from the CPU 11 and data predicted to be requested next time from the CPU 11, then holds the data transferred from the HDD unit 72 in response to the request. The data predicted to be requested next time is, for example, the data requested previously from the CPU 11 and/or the look-ahead data of the data requested from the CPU 11.

The configuration of the HDD unit 72 shown in FIG. 6 is the same as that of the HDD 22 shown in FIG. 1. Although the HDD unit 72 is provided with a disk cache 75 having functions of a low-ranking cache memory, the cache controlling of the HDD unit 72 is different from that of the disk cache 54 of the HDD unit 22. The disk cache 75 is composed so as to erase the data read from the HDD unit 72. The disk cache 75 has a storage capacity of, for example, several megabytes to several tens of megabytes.

The disk cache 75 of the HDD unit 72 (precisely, it is a cache controller (not illustrated)), when not holding the data requested from the main memory 15, reads the data from the magnetic disk 41. The data includes both data requested from the main memory 15 and data predicted to be requested next time from the main memory 15. The disk cache 75 then holds the data requested from the main memory 15 and transfers the held data to the main memory 15. When the requested data is transferred to the main memory 15, the disk cache 75 erases the data and holds the data predicted to be requested next time from the main memory 15. The data predicted to be requested next time includes, for example, look-ahead data of the data requested from the main memory 15.

"Erase" in the present specification means not only erasing of data transferred to the main memory, but also updating of the control data (tag, valid flag, etc.) of the data held in the memory management area together with the data and other processings related to the erasure of the data, for example, specification of those areas for the data items as empty areas.

FIG. 7 shows an example of the operation of a cache memory for holding data.

It is premised here that neither the disk cache 16 of the main memory 15 (cache memory of the host system) nor the disk cache 75 of the HDD unit 72 (cache memory of the low-ranking unit) holds the data requested from the CPU 11 (application program).

At first, an application program requests the main memory 15 for transfer of data. Then, a cache mis-hit occurs in the disk cache 16 of the main memory 15. The HDD unit 72 is thus requested for transfer of data A including both data requested from the application program and the data predicted to be requested next time from the application program. As a result, a cache mis-hit occurs in the disk cache 75 of the HDD unit 72. The data A requested from the main memory 15 is thus read from the magnetic disk 41 and held in the disk cache 75, and then it is transferred to the main memory 15. Consequently, the data A is held in the disk cache 16 of the main memory 15.

Furthermore, when the data A is transferred to the main memory 15, the HDD unit 72 erases the data A from its disk cache 75. After that, the host system reads the data B in the address following that of the transferred data A from the magnetic disk 41 and holds the data B in its disk cache 75.

According to the conventional data reading method shown in FIG. 12, the cache memory of the conventional HDD unit holds both data D3 requested from the host system and data D4 (look-ahead data) in the address following that of the data D3. In contrast, the cache memory of the HDD unit in this second embodiment does not hold the data A requested from the host system, but holds only the data B (look-ahead data) in the address following that of the data A.

Consequently, if the storage capacity is the same in both cache memories, the cache memory of the HDD unit in the first embodiment can hold much more look-ahead data than that of the conventional HDD unit. In FIG. 12, the data B1 means the look-ahead data D4 that can be held in the cache memory of the conventional HDD unit and the data B2 means the look-ahead data following the data B1 read from the magnetic disk after the data A is erased from the cache memory. Consequently, it is possible to make the most use of the localization of the data space so as to improve the hit rate of the cache memory in the first embodiment. This is why the cache memory in this embodiment can hold data more efficiently.

There are two types for data localization; time localization and space localization. Time localization means a high possibility of accessing data in the same address repetitively. Space localization means a high possibility of accessing data in addresses close to the accessed data.

FIGS. 8 through 11 show another example of the operation of the cache memory for holding data.

As shown in FIG. 8, the disk cache 16 of the main memory 15 employs data A2 requested last from an application program as the data predicted to be requested next time from the application program. This is why the time localization of data can be used so as to improve the hit rate of the disk cache 16.

As shown in FIG. 9, the disk cache 16 of the main memory 15 employs the look-ahead data A2 of the data A1 requested from an application program as the data predicted to be requested next time from the application program. Consequently, it is possible to make the most use of the space localization of data so as to improve the hit rate of the disk cache 16.

In the example shown in FIG. 10, the disk cache 16 of the main memory 15 has a plurality of segments, for example, three segments of segment 1, segment 2, and segment 3. In those segments 1 to 3 are held data items requested of the HDD unit 72 repetitively according to the commands issued sequentially from an application program.

Segment 1 holds data Al requested by the command 1 from the application program and the look-ahead data A2 of the data A1. Segment 2 holds data A3 requested by the command 2 from the application program and look-ahead data A4 of the data A3. And, segment 3 holds data A5 requested by the command 3 from the application program and look-ahead data A6 of the data A5. If a cache memory is divided into a plurality of segments in this way, therefore, it is possible to make the most use of the time localization of data so as to improve the hit rate of the disk cache 16.

On the other hand, the disk cache 75 of the HDD unit 72 holds the latest data A5 requested from the main memory 15 and the look-ahead data B of the data A6. Consequently, it is possible to make the most use of the space localization of data so as to improve the hit rate of the disk cache 75.

In the example shown in FIG. 11, the disk cache 75 of the HDD unit 72 also has a plurality of segments, for example, three segments of segments 1 to 3. In those segments 1 to 3 of the disk cache 16 of the main memory 15 are held data items; data A1, data A2, and data A3 requested from an HDD unit 72 according to command 1, command 2, and command 3 requested sequentially by an application program. In the segments 1 to 3 of the disk cache 75 of the HDD unit 72 are also held data items; look-ahead data Cl, C2, and C3 of the data A1, A2, and A3 requested from the main memory 15 sequentially. Consequently, it is possible to make the most use of the time localization of data so as to improve the hit rate of the disk cache 75.

The method for disposing a plurality of segments in a cache memory is not limited only to that described above; for example, other conventional well-known methods, such as direct mapping, full associative, set associative, etc. can also be employed. The size of each segment is not limited only to a fixed one; it may be variable.

In the second embodiment, there are two stages for the storage layer; the disk cache 16 (high-ranking cache memory) of the main memory 15 and the disk cache 75 (low-ranking cache memory) of the HDD unit 72. However, the situation where the low-ranking cache memory holds the same data transferred to the high-ranking cache memory is avoided. On the contrary, if there are three storage layers of main memory, extended card, and HDD unit as described in the first embodiment, it can be specified that the cache memory of the extended card does not hold the data transferred from the extended card to the main memory and the cache memory of the HDD unit does not hold the data transferred from the HDD unit to the extended card.

In the first and second embodiments, the HDD unit is defined as the lowest-ranking storage unit. However, the lowest-ranking storage unit is not limited only to such an HDD unit; for example, such a disk unit as a magnetic tape unit, an optical magnetic disk unit, etc. may also be employed.

As described above, the present invention is especially suitable for peripheral devices provided with a cache memory respectively. Because the primary cache, the secondary cache, and the main memory are usually installed on the mother board of the object computer system, the method of data transfer among those memories is designed optimally as an integrated system. On the contrary, because such conventional peripheral devices as an extended card, an HDD unit, etc. are usually designed independently, those devices are not always designed optimally with respect to the high-ranking storage layer. And, according to the present invention, it is avoided that the low-ranking cache memory holds the data held in the high-ranking cache memory as much as possible, thereby the hit rate of the low-ranking cache memory can be improved by making the most use of the localization of data. Consequently, the method of data transfer among those memories can be designed optimally with respect to the high-ranking storage layer.

Furthermore, the present invention is most effective when both high-ranking and low-ranking cache memories have approximately the same storage capacity. This is because if the low-ranking cache memory has a storage capacity extremely larger than the high-ranking cache memory, the amount of the data becomes small for the storage capacity of the low-ranking cache memory even when the same data is held in both high-ranking and low-ranking cache memories.

On the contrary, if both high-ranking and low-ranking cache memories have almost the same storage capacity, the amount of the data becomes large for the storage capacity of the low-ranking cache memory when the same data is held in both high-ranking and low-ranking cache memories. Consequently, it is possible for the low-ranking cache memory to hold such data as look-ahead data instead of the data transferred to the high-ranking cache memory, thereby the hit rate of the low-ranking cache memory is relatively improved.

According to the present invention, therefore, both high-ranking and low-ranking cache memories can be operated in different swap modes. It is thus possible to reduce the possibility that the low-ranking cache memory holds the same data as that held in the high-ranking cache memory, thereby each of those cache memories can hold data more efficiently.

Furthermore, according to the present invention, if a request of data transfer is issued from the host system to the low-ranking cache memory, the low-ranking cache memory erases the data transferred to the host system in response to the request. If a request of data transfer is issued from the high-ranking cache memory to the low-ranking cache memory, the low-ranking cache memory erases the data transferred to the high-ranking cache memory in response to the request. Consequently, the low-ranking cache memory can hold data more efficiently.

We claim:

1. A method for controlling a plurality of cache memories in a computer system comprising a low-ranking cache memory and a high-ranking cache memory, said method comprising:

operating said high-ranking cache memory in a first swap mode;

operating said low-ranking cache memory in a second swap mode different from said first; exchanging select information for selecting said first and second swap modes of each cache memory when a system is started up; and each cache memory selecting a swap mode different from any other cache memory based on the exchanged select information.

2. The method for controlling a plurality of cache memories according to claim 1, wherein one of said high-ranking and low-ranking cache memories transfers select information for selecting a swap mode of the other cache memory to the other cache memory; and said other cache memory selects its swap mode according to said select information transferred from said one cache memory.

3. The method for controlling a plurality of cache memories according to claim 2, wherein said one cache memory selects a swap mode and identifies said selected swap mode to said other cache memory; and said other cache memory selects a swap mode different from said identified swap mode as its swap mode.

4. The method for controlling a plurality of cache memories according to claim 2, wherein, said one cache memory transfers a plurality of swap modes that said one cache memory cannot select to said other cache memory; and said other cache memory selects one of said transferred swap modes.

5. The method for controlling a plurality of cache memories according to claim 1, wherein said high-ranking and low-ranking cache memories are operated in different swap modes selected respectively from among an LRU (Least Recently Used) mode, an LFU (Least Frequently Used) mode, a FIFO (First-In First-Out) mode, and a mode for swapping out one of a plurality of segments holding the least amount of data.

6. The method for controlling a plurality of cache memories according to claim 1, wherein said high-ranking cache memory is a disk cache provided for a hard disk control unit for controlling a hard disk drive unit and said low-ranking cache memory is a disk cache provided for said hard disk drive unit.

7. A method for controlling a plurality of cache memories in a computer system comprising a low-ranking cache memory and a high-ranking cache memory, said method comprising:

operating said high-ranking cache memory in a first swap mode;

operating said low-ranking cache memory in a second swap mode different from said first; exchanging select information for selecting said first and second swap modes of each cache memory when a system is started up;

each cache memory selecting a swap mode different from any other cache memory based on the exchanged select information;

one of said high-ranking and low-ranking cache memories transferring a plurality of swap modes for selection to an other cache memory;

said other cache memory selecting one of said transferred swap modes;

notifying said one cache memory to select said selected swap mode;

said other cache memory selecting a swap mode different from said responded swap mode as its swap mode; and said one cache memory selecting said notified swap mode as its swap mode.

8. A computer system, comprising:

a low-ranking cache memory;

a high-ranking cache memory connected to said low-ranking cache memory; and an information exchanger between said high-ranking and low-ranking cache memories through which select information for selecting a swap mode is exchanged wherein each cache memory selects different swap modes respectively according to said exchanged select information.

9. The computer system according to claim 2, further comprising:

a transferring device in one of said high-ranking andlow-ranking cache memories for transferring to another of said cache memories select information for selecting a swap mode of said other cache memory; and a selecting device in said other cache memory for selecting its swap mode according to said select information received from said one cache memory.

10. The computer system according to claim 9, further comprising:

a mode selecting device in said one cache memory for selecting its swap mode, wherein said transferring device transfers a swap mode selected by said mode selecting device to the other cache memory, and said selecting device of said other cache memory selects a swap mode different from said swap mode received from said one cache memory as a swap mode of said other cache memory.

11. The computer system according to claim 9, wherein said transferring device of said one cache memory transfers a plurality of swap modes that said one cache memory cannot select, to the other cache memory; and said selecting device of said other cache memory selects one of the plurality of said swap modes received from said one cache memory as its swap mode.

12. The computer system according to claim 8, wherein said high-ranking cache memory and said low-ranking cache memory are operated in different swap modes selected from LRU (Least Recently Used) mode, LFU (Least Frequently Used) mode, FIFO ( First-In First-Out) mode, and a mode for swapping out a segment holding the least amount of data among a plurality of segments.

13. The computer system according to claim 8, wherein said high-ranking cache memory is a disk cache provided for a hard disk control unit for controlling a hard disk unit; and said low-ranking cache memory is a disk cache provided for said hard disk drive unit.

14. The computer system of claim 8, further comprising:

a hard disk drive unit provided with a cache memory for holding a portion of data stored in a magnetic disk wherein said low-ranking cache memory is said hard disk drive cache memory; and a main memory for holding a portion of data stored in a hard disk drive unit and sending/receiving data to/from said hard disk drive unit according to an instruction issued from a central processing unit wherein said high-ranking cache memory is said main memory.

15. A computer system, comprising:

a low-ranking cache memory;

a high-ranking cache memory connected to said low-ranking cache memory; and an information exchanger between said high-ranking and low-ranking cache memories through which select information for selecting a swap mode is exchanged wherein each cache memory selects different swap modes respectively according to said exchanged select information;

a candidate mode transferring device in one of said high-ranking and low-ranking cache memories for transferring a plurality of swap modes that said one cache memory is capable of selecting to the other cache memory;

a mode selecting device in said one cache memory for selecting said swap mode received from said other cache memory as said one cache memory swap mode;

a partner's mode selecting device in said other cache memory for selecting a swap mode that said one cache memory should select, from among a plurality of said swap modes received from said one cache memory;

a partner's mode transferring device in said other cache memory for transferring a swap mode selected by said other cache memory for said one cache memory to said one cache memory; and a self-mode selecting device in said other cache memory for selecting a swap mode different from said swap mode selected by said partner's mode selecting device as a swap mode of said other cache memory.

16. A hard disk control unit, comprising:

a first connection terminal connected to a connection terminal of a peripheral device provided for a computer system;

a second connection terminal connected to a hard disk drive unit having a low-ranking cache memory for storing part of data stored in a storage media; and a high-ranking cache memory for holding a portion of data stored in said hard disk drive unit connected to said second connection terminal;

a controller for controlling said hard disk unit connected to said second connection terminal;

an information exchanger between said high-ranking and said low-ranking cache memories for selecting a swap mode of each cache memory so as to be operated in different swap modes when said computer system connected to said first connection terminal is started up; and a swap mode selector for selecting a swap mode of said high-ranking cache memory according to said exchanged select information.

17. A hard disk control unit, comprising:

a first connection terminal connected to a connection terminal of peripheral device provided for a computer system provided with a host system having functions of a high-ranking cache memory;

a second connection terminal connected to a hard disk drive unit; and a low-ranking cache memory for holding a portion of data stored in said hard disk drive unit connected to said second connection terminal;

a controller for controlling said hard disk drive unit connected to said second connection terminal;

an information exchanger between said high-ranking cache memory and said low-ranking cache memory for selecting swap modes as so to be operated in different swap modes when said computer system connected to said first connection terminal is started up; and a swap mode selector for selecting a swap mode of said low-ranking cache memory according to said exchanged select information.

* * * * *